US007100568B2

(12) United States Patent
Bornmann et al.

(10) Patent No.: US 7,100,568 B2
(45) Date of Patent: Sep. 5, 2006

(54) DIRECT ELECTROMAGNETIC DRIVE FOR A THROTTLE VALVE SHAFT IN A THROTTLE VALVE CONNECTOR

(75) Inventors: Gerd Bornmann, Hochheim (DE); Wolfgang Sauerschell, Hattenheim (DE); Lutz Scholten, Aachen (DE); Peter Wiese, Kelkheim (DE)

(73) Assignee: Siemens AG, München (DE)

( * ) Notice: Subject to any disclaimer, the term of this patent is extended or adjusted under 35 U.S.C. 154(b) by 77 days.

(21) Appl. No.: 11/014,992

(22) Filed: Dec. 20, 2004

(65) Prior Publication Data

US 2005/0098153 A1 May 12, 2005

Related U.S. Application Data

(63) Continuation of application No. PCT/DE03/01756, filed on May 28, 2003.

(30) Foreign Application Priority Data

Jun. 27, 2002 (DE) ................................ 102 28 856

(51) Int. Cl.
*F02D 9/08* (2006.01)
*F16K 31/02* (2006.01)

(52) U.S. Cl. ...................... 123/337; 123/399; 251/305; 251/129.15

(58) Field of Classification Search ................ 123/337, 123/399; 251/305, 129.15
See application file for complete search history.

(56) References Cited

U.S. PATENT DOCUMENTS

| | | | | | |
|---|---|---|---|---|---|
| 4,392,375 | A | * | 7/1983 | Eguchi et al. | 73/118.1 |
| 5,070,728 | A | * | 12/1991 | Kubota et al. | 73/118.1 |
| 5,408,153 | A | | 4/1995 | Imai et al. | |
| 5,609,184 | A | * | 3/1997 | Apel et al. | 137/554 |
| 5,624,100 | A | * | 4/1997 | Bolte et al. | 251/65 |
| 5,738,072 | A | | 4/1998 | Bolte et al. | |
| 5,785,296 | A | | 7/1998 | Peube et al. | |
| 5,823,165 | A | * | 10/1998 | Sato et al. | 123/399 |
| 5,927,249 | A | * | 7/1999 | Ackermann et al. | 123/399 |
| 5,996,554 | A | * | 12/1999 | Tojo et al. | 123/399 |
| 6,067,961 | A | * | 5/2000 | Kato | 123/399 |
| 6,109,589 | A | * | 8/2000 | Ackermann | 251/65 |

(Continued)

FOREIGN PATENT DOCUMENTS

DE 3735901 A1 5/1989

(Continued)

OTHER PUBLICATIONS

Derwent Abstract—DE-19926895A1; Dec. 14, 2000; Pierburg AG, D-41460 Neuss (Germany).

(Continued)

*Primary Examiner*—Hai Huynh
(74) *Attorney, Agent, or Firm*—Siemens AG

(57) ABSTRACT

The direct drive for a throttle valve shaft in a throttle valve manifold comprises a coil and a rotor arranged directly adjacent to the coil. The rotor is made from a steel ring inside which a first inner magnetic shell and a second inner magnetic shell lie opposite each other. The steel ring has a first outer magnetic shell and a second outer magnetic shell lying opposite each other on the outside thereof. The steel ring is connected to the throttle valve shaft on the end thereof facing the throttle valve. A sensor for position recognition of the throttle valve is arranged in the middle of that region of the end of the steel ring facing away from the throttle valve.

9 Claims, 3 Drawing Sheets

U.S. PATENT DOCUMENTS

| | | | | | |
|---|---|---|---|---|---|
| 6,116,215 | A * | 9/2000 | Soleanicov et al. | 123/399 |
| 6,222,290 | B1 | 4/2001 | Schob et al. | |
| 6,239,562 | B1 * | 5/2001 | Turner | 318/139 |
| 6,332,451 | B1 * | 12/2001 | Sato et al. | 123/399 |
| 6,516,776 | B1 * | 2/2003 | Kai et al. | 123/337 |
| 6,575,149 | B1 * | 6/2003 | Gagnon | 123/568.24 |
| 6,622,695 | B1 * | 9/2003 | Kondo | 123/336 |
| 6,641,111 | B1 * | 11/2003 | Lorenz et al. | 251/305 |
| 6,646,435 | B1 * | 11/2003 | Nakamura et al. | 324/207.25 |
| 6,703,827 | B1 * | 3/2004 | Wolf et al. | 324/207.12 |

FOREIGN PATENT DOCUMENTS

| | | | |
|---|---|---|---|
| DE | 19504243 | A1 | 12/1995 |
| DE | 19926895 | A1 | 12/2000 |
| DE | 10133631 | A1 | 1/2003 |
| EP | 0 859 139 | A2 | 8/1998 |
| EP | 0984549 | A1 | 3/2000 |
| WO | WO 2004/003363 | * | 1/2004 |

OTHER PUBLICATIONS

Derwent Abstract—DE-19504243A1; Dec. 14, 2005; Philips Patentverwaltung GmbH, D-22335 Hamburg (Germany).

Derwent-Abstract—EP-0984549A1; Mar. 8, 2000; Caspar Hohoff, D-40217 Düsseldor (Germany).

Derwent-Abstract—DE-3735901A1, May 3, 1989; VDO Adolf Schindling AG, D-6000 Frankfurt (Germany).

Derwent-Abstract—DE-10133631A1; Jan. 30, 2003; Siemens AG, D-80333 München (Germany).

* cited by examiner

FIG 1B A-A
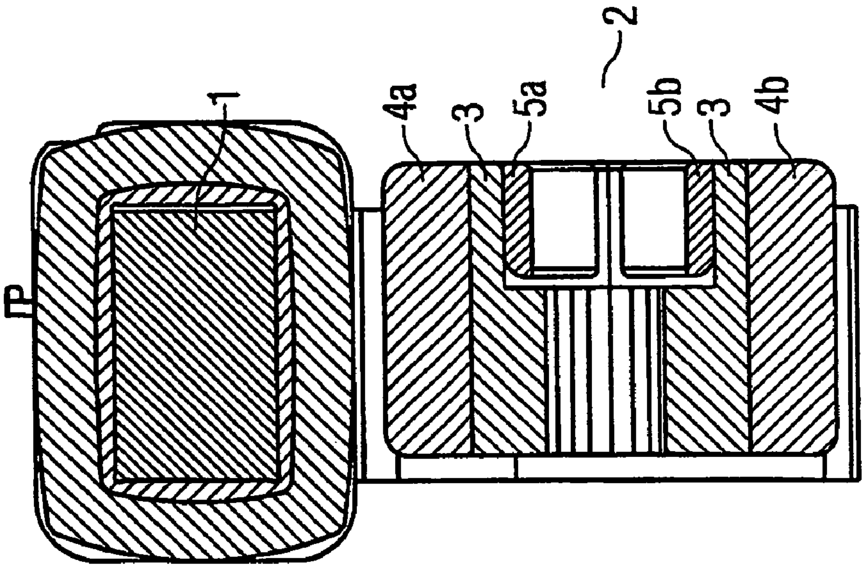
FIG 1A
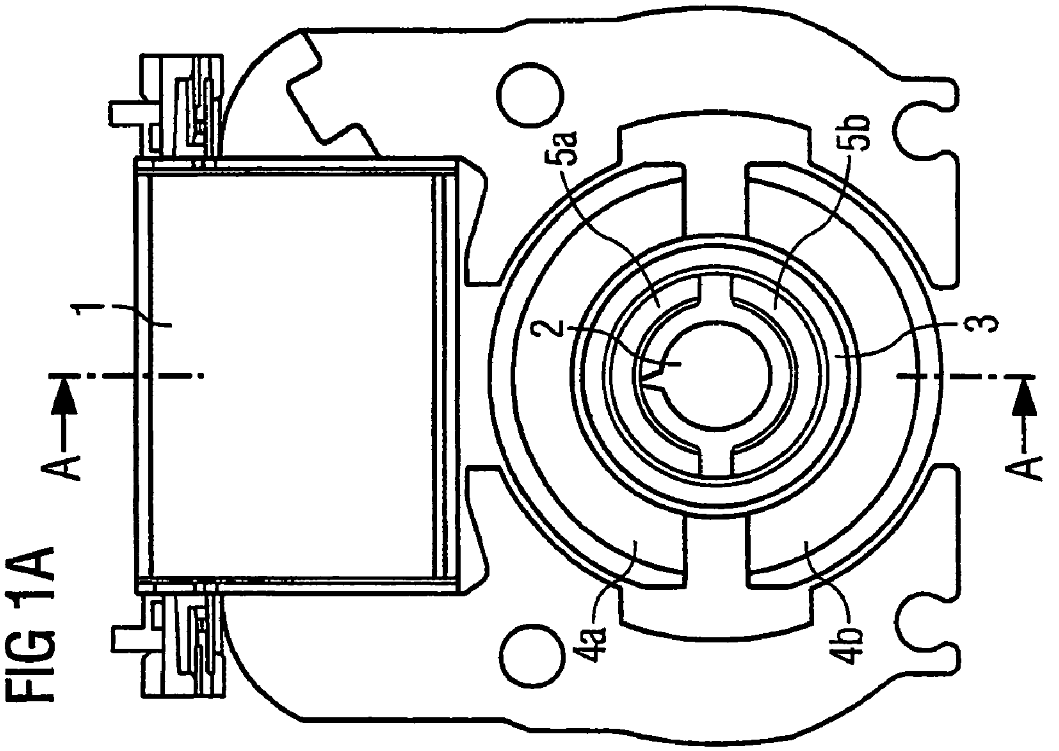

FIG 2 A-A
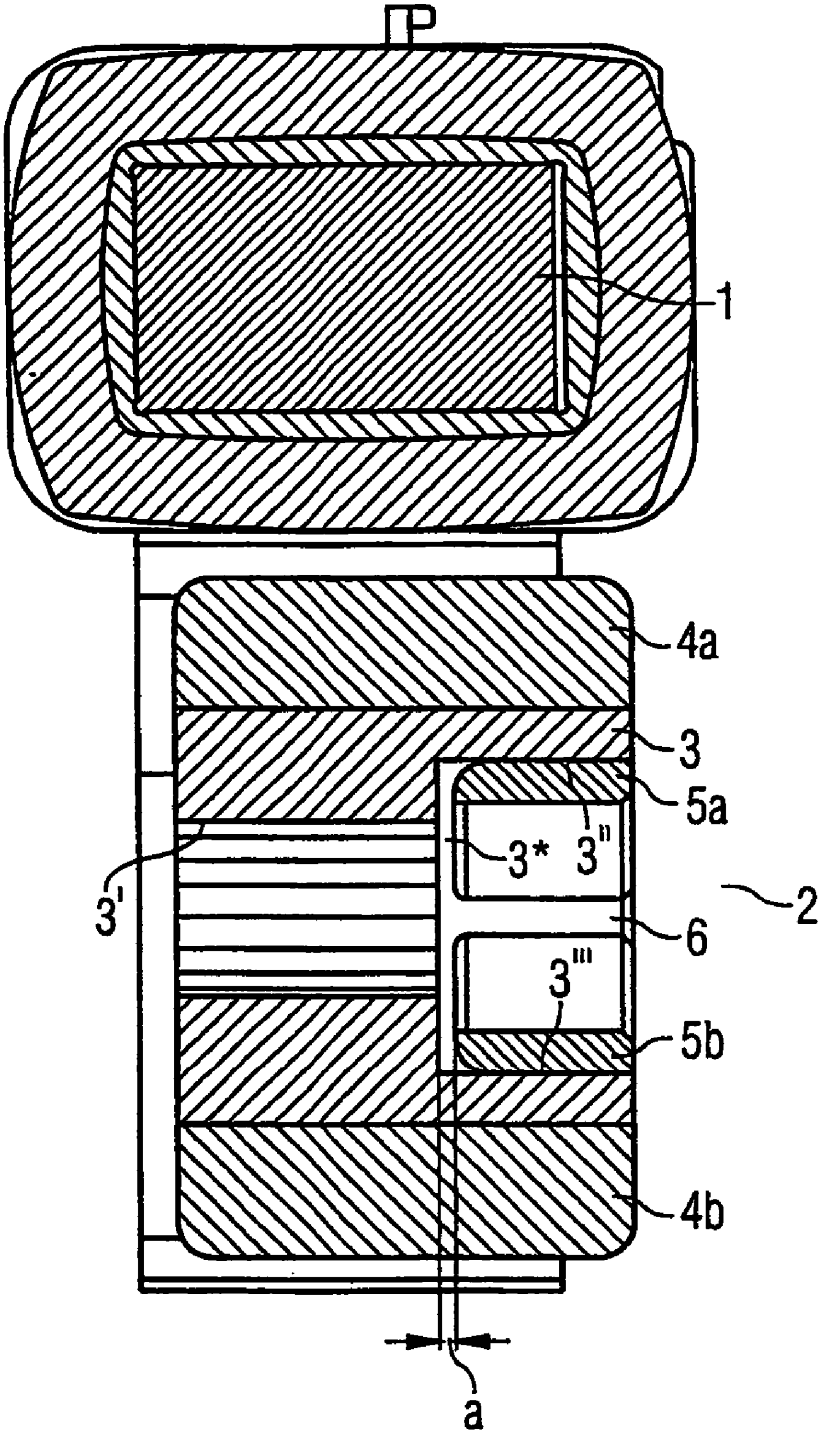

DIRECT ELECTROMAGNETIC DRIVE FOR A THROTTLE VALVE SHAFT IN A THROTTLE VALVE CONNECTOR

BACKGROUND OF THE INVENTION

The invention relates to a direct drive for a throttle valve shaft in a throttle valve connector. Direct drives are known. They generally involve the arrangement of a coil, to which electrical current is applied, and a rotor, which is arranged in the region of action of the latter, is provided with permanent magnets and is made to rotate by induction of the coil.

SUMMARY OF THE INVENTION

The invention is based on the object of providing a direct drive for a throttle valve shaft in a throttle valve connector, which drive can be used to continuously detect the position of the throttle valve and which requires only a relatively small installation space.

The object on which the invention is based is achieved by a direct drive for a throttle valve shaft in a throttle valve connector, which drive comprises a coil and a rotor which is arranged directly adjacent to the coil, in which the rotor is made from a steel ring inside which a first inner magnetic shell and a second inner magnetic shell bear opposite one another and on the outside of which a first outer magnetic shell and a second outer magnetic shell bear opposite one another, and in which the steel ring is connected to the throttle valve shaft at that end of said steel ring which faces the throttle valve, and in which a sensor for detecting the position of the throttle valve is arranged in the middle of the region of that end of the steel ring which faces away from the throttle valve. The rotor is arranged directly adjacent to the coil. This is to be understood as an arrangement of the rotor in the region of the magnetic field produced by the coil, in which case the region of that end of the steel ring—facing away from the throttle valve—in which the sensor is arranged extends over part of the width of the coil. It is particularly advantageous if the inner lateral surface of the steel ring which is connected to the throttle valve shaft is made of a nonmagnetic material. In this case, an intermediate layer of plastic may be provided. The sensors used are, for example, commercially available AMR (Anisotropic Magneto Resistor) sensors which, for example, are marketed by Philips. The first inner magnetic shell and the second inner magnetic shell are used for position detection with respect to the position of the throttle valve by means of the arranged sensor. The first outer magnetic shell and the second outer magnetic shell serve to drive the rotor by means of the coil. It has surprisingly been found that it is relatively easy to detect the position of the throttle valve in the throttle valve connector using the direct drive for a throttle valve shaft in a throttle valve connector, with only relatively little installation space being required since the sensor is arranged over part of the coil. In this case, the arrangement of the steel ring has the advantage that by virtue of the first inner magnetic shell and the second inner magnetic shell on the one hand, and the first outer magnetic shell and the second outer magnetic shell on the other, the magnetic fields do not have a disadvantageous effect on one another, so that the sensor is supplied with accurate information about the actual position of the throttle valve in the throttle valve connector and this information can then subsequently be forwarded to the control units. For this purpose, it is advantageously not necessary to arrange the sensor outside the rotor of the direct drive in order to ascertain the precise detection of the position of the throttle valve in the throttle valve connector, which would make a relatively large installation space necessary.

A preferred refinement of the invention comprises arranging the first inner magnetic shell and the first outer magnetic shell and, respectively, the second inner magnetic shell and the second outer magnetic shell in parallel with one another on the same half of the steel ring. This advantageously makes production of the rotor of the direct drive for a throttle valve shaft easier.

According to a further refinement of the invention, the first inner magnetic shell and the first outer magnetic shell and, respectively, the second inner magnetic shell and the second outer magnetic shell have the same magnetic polarity. In this way, the course of the magnetic lines in the region of the steel ring may be optimized, as a result of which the quality of information which is fed to the sensor can likewise be optimized.

A further preferred refinement of the invention comprises the steel ring having, in the region of that end which faces away from the throttle valve, an annular slot in which the first inner magnetic shell and the second inner magnetic shell rest on the steel ring. In this way, the first inner magnetic shell and the second inner magnetic shell may be reliably secured in the steel ring in a relatively simple manner, while at the same time the first inner magnetic shell and the second inner magnetic shell are prevented from extending over the entire width of the steel ring. In this case, it is advantageous for the first inner magnetic shell and the second inner magnetic shell to be located only in the region of the sensor, and thus even very small disruptive influences on the actual drive are avoided.

A further refinement of the invention comprises the first inner magnetic shell or the second inner magnetic shell being arranged at a distance a of 1 mm to 3 mm from the stop of the steel ring which adjoins the annular slot. In this way, the shielding effect of the steel ring may be optimized, and this has an advantageous effect on the detection of the position of the throttle valve.

According to a further preferred refinement of the invention, the first inner magnetic shell and the second inner magnetic shell or the first outer magnetic shell and the second outer magnetic shell are respectively arranged as a single part. The single part thus acts as a ring magnet. This makes production of the direct drive for a throttle valve shaft easier since the number of single parts which need to be secured in the region of the rotor is reduced.

BRIEF DESCRIPTION OF THE SEVERAL VIEWS OF THE DRAWINGS

The invention is explained below in greater detail and by way of example with reference to the drawing (FIGS. 1, *a*), *b*); FIG. 2.

FIGS. 1 *a*), *b*) show a side view and a cross section of the direct drive for a throttle valve shaft in a throttle valve connector.

FIG. 2 shows an enlarged cross section of the direct drive for a throttle valve shaft in a throttle valve connector according to FIG. 1 *b*).

FIGS. 3 *a*), *b*) show the direct drive for a throttle valve shaft in a throttle valve connector in exploded, three-dimensional form.

DETAILED DESCRIPTION OF THE INVENTION

In FIG. 1, the direct drive for a throttle valve shaft in a throttle valve connector is illustrated in side view and in cross section through section A—A. Said drive comprises a coil 1 and a rotor 2 which is arranged directly adjacent to the coil 1, with the rotor 2 being made from a steel ring 3 inside which a first inner magnetic shell 5*a* and a second inner magnetic shell 5*b* bear opposite one another. On the outside of the steel ring 3, a first outer magnetic shell 4*a* and a second outer magnetic shell 4*b* are arranged opposite one another, these magnetic shells serving to produce the rotary movement via the coil 1. The steel ring 3 is connected to the throttle valve shaft (not illustrated) and in the middle has a sensor (not illustrated) for detecting the position of the throttle valve. It is clear from FIG. 1 *b*) that the width of the coil 1 extends over the entire width of the rotor 2.

In FIG. 2, the direct drive for a throttle valve shaft in a throttle valve connector through section A—A in FIG. 1 is illustrated in enlarged form. The steel ring 3 has, in the middle of the region 6 of that end 3" which faces away from the throttle valve (not illustrated), a sensor (not illustrated) for detecting the position of the throttle valve. In the region 6 of that end 3" which faces away from the throttle valve, the steel ring 3 has an annular slot 3'" in which the first inner magnetic shell 5*a* and the second inner magnetic shell 5*b* rest on the steel ring 3. In this case, the first inner magnetic shell 5*a* and the second inner magnetic shell 5*b* are arranged at a distance a of 1 mm to 3 mm from the stop 3* of the steel ring 3 which adjoins the annular slots 3'". At its end 3' which faces the throttle valve, the steel ring 3 is connected to the throttle valve shaft (not illustrated).

Figure 3A:
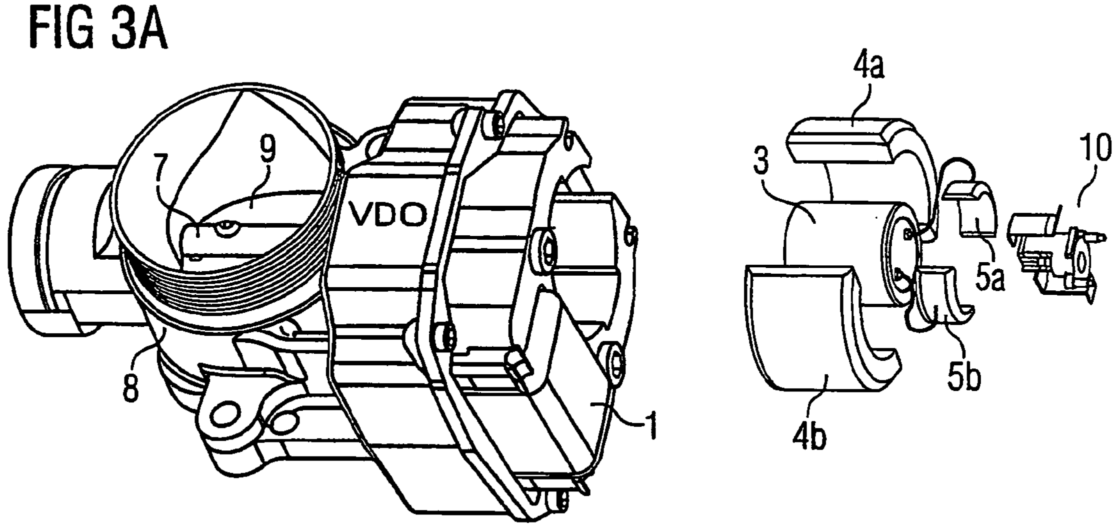
FIGS. 3, *a*), *b*)).
Figure 3B:
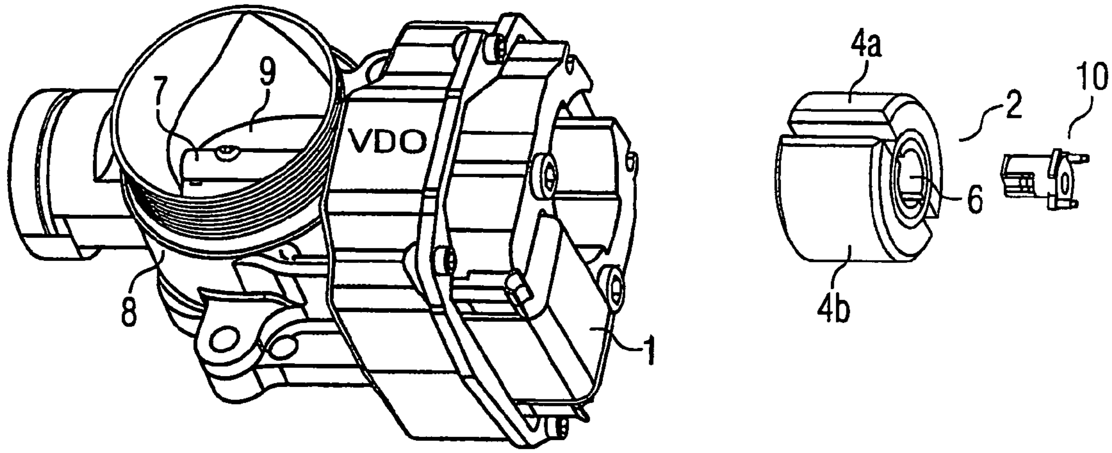

In FIGS. 3 *a*), *b*), the direct drive for a throttle valve shaft 7 in a throttle valve connector 8 is illustrated in the form of a three-dimensional, exploded drawing. The first inner magnetic shell 5*a* and the second inner magnetic shell 5*b* are arranged bearing inside the steel ring 3 and opposite one another in accordance with the direction of the arrow. In order to detect the position of the throttle valve 9, the sensor 10 is arranged in the middle of the region 6 of that end 3" (not illustrated) of the steel ring 3 which faces away from the throttle valve 9. The sensor 10 is a commercially available position sensor, with AMR (Anisotropic Magneto Resistor) sensors being used, for example. These sensors are marketed by Philips, for example under the type designation KMZ41. The steel ring 3 has a shielding effect and prevents the first inner magnetic shell 5*a* and the second inner magnetic shell 5*b* on the one hand, and the first outer magnetic shell 4*a* and the second outer magnetic shell 4*b* on the other, having a adverse effect on one another. The first inner magnetic shell 5*a* and the second inner magnetic shell 5*b* or the first outer magnetic shell 4*a* and the second outer magnetic shell 4*b* can also respectively be manufactured as a single part. The sensor 10 is particularly advantageously arranged in the middle of the interior of the rotor 2, as a result of which the installation space required can be minimized.

The invention claimed is:

1. A direct drive for a throttle valve shaft in a throttle valve connector, comprising: a coil and a rotor which is arranged directly adjacent to the coil, wherein the rotor is made from a steel ring inside which a first inner magnetic shell and a second inner magnetic shell bear opposite one another and on the outside of which a first outer magnetic shell and a second outer magnetic shell bear opposite one another, and in which the steel ring is connected to the throttle valve shaft at that end of the steel ring which faces the throttle valve, and in which a sensor for detecting the position of the throttle valve is arranged in the middle of the region of that end of the steel ring which faces away from the throttle valve.

2. The direct drive according to claim 1, wherein the first inner magnetic shell and the first outer magnetic shell and, respectively, the second inner magnetic shell and the second outer magnetic shell are arranged in parallel with one another on a same half of the steel ring.

3. The direct drive according to claim 2, wherein the first inner magnetic shell and the first outer magnetic shell and, respectively, the second inner magnetic shell and the second outer magnetic shell have a same magnetic polarity.

4. The direct drive according to claim 3, wherein the steel ring has, in the region of that end which faces away from the throttle valve, an annular slot in which the first inner magnetic shell and the second inner magnetic shell rest on the steel ring.

5. The direct drive according to claim 4, wherein the first inner magnetic shell and the second inner magnetic shell or the first outer magnetic shell and the second outer magnetic shell are respectively arranged as a single part.

6. The direct drive according to claim 2, wherein the steel ring has, in the region of that end which faces away from the throttle valve, an annular slot in which the first inner magnetic shell and the second inner magnetic shell rest on the steel ring.

7. The direct drive according to claim 1, wherein the steel ring has, in the region of that end which faces away from the throttle valve, an annular slot in which the first inner magnetic shell and the second inner magnetic shell rest on the steel ring.

8. The direct drive according to claim 7, wherein the first inner magnetic shell and the second inner magnetic shell are arranged at a distance of 1 mm to 3 mm from the stop of the steel ring which adjoins the annular slot.

9. The direct drive according to claim 1, wherein the first inner magnetic shell and the second inner magnetic shell or the first outer magnetic shell and the second outer magnetic shell are respectively arranged as a single part.

* * * * *